US012753320B2

(12) United States Patent
Tanaka et al.

(10) Patent No.: US 12,753,320 B2
(45) Date of Patent: *Oct. 6, 2026

(54) COATING COMPOSITION CONTAINING FLUORINE POLYMER

(71) Applicant: DAIKIN INDUSTRIES, LTD., Osaka (JP)

(72) Inventors: Yoshito Tanaka, Osaka (JP); Makoto Matsuura, Osaka (JP); Yuuki Suzuki, Osaka (JP); Akitoshi Ogata, Osaka (JP); Yosuke Kishikawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 740 days.

This patent is subject to a terminal disclaimer.

(21) Appl. No.: 17/858,414

(22) Filed: Jul. 6, 2022

(65) Prior Publication Data

US 2022/0363934 A1 Nov. 17, 2022

Related U.S. Application Data

(63) Continuation of application No. PCT/JP2021/000253, filed on Jan. 6, 2021.

(30) Foreign Application Priority Data

Jan. 8, 2020 (JP) ................................. 2020-001641

(51) Int. Cl.

*C09D 127/12* (2006.01)
*C08F 14/18* (2006.01)
*C08F 16/38* (2006.01)
*C08F 116/38* (2006.01)
*C09D 7/20* (2018.01)

(52) U.S. Cl.

CPC .......... *C09D 127/12* (2013.01); *C08F 14/185* (2013.01); *C09D 7/20* (2018.01); *C08F 16/38* (2013.01); *C08F 116/38* (2013.01)

(58) Field of Classification Search

CPC ... C09D 127/12; C09D 137/00; C08F 14/185; C08F 16/38; C08F 116/38

See application file for complete search history.

(56) References Cited

U.S. PATENT DOCUMENTS

| | | | |
|---|---|---|---|
| 3,308,107 | A | 3/1967 | Selman et al. |
| 3,450,716 | A | 6/1969 | Selman et al. |
| 4,429,143 | A | 1/1984 | Anderson et al. |
| 6,201,085 | B1 | 3/2001 | Matsukura et al. |
| 6,284,379 | B1 | 9/2001 | Matsukura et al. |
| 6,491,979 | B1 | 12/2002 | Yamaguchi et al. |
| 2006/0189788 | A1 | 8/2006 | Araki et al. |
| 2006/0194936 | A1 | 8/2006 | Eriguchi et al. |
| 2008/0015298 | A1 | 1/2008 | Xiong et al. |
| 2008/0293863 | A1 | 11/2008 | Otozawa et al. |
| 2010/0048956 | A1 | 2/2010 | Isaka et al. |
| 2010/0080903 | A1 | 4/2010 | Tamitsuji et al. |
| 2010/0134879 | A1 | 6/2010 | Yoshihara et al. |
| 2011/0105686 | A1 | 5/2011 | Kashiwagi |
| 2012/0156504 | A1 | 6/2012 | Takebe et al. |
| 2012/0208038 | A1 | 8/2012 | Kondo et al. |
| 2013/0199828 | A1 | 8/2013 | Nakabayashi et al. |
| 2014/0323661 | A1 | 10/2014 | Avataneo et al. |
| 2015/0243856 | A1 | 8/2015 | Yamada et al. |
| 2015/0299506 | A1 | 10/2015 | Fan et al. |
| 2017/0009000 | A1 | 1/2017 | Hendershot et al. |
| 2017/0114242 | A1 | 4/2017 | Lloyd et al. |
| 2017/0114253 | A1 | 4/2017 | Nakayama et al. |
| 2019/0194475 | A1 | 6/2019 | Takeuchi et al. |
| 2019/0312202 | A1 | 10/2019 | Yokoyama et al. |
| 2022/0259453 | A1 | 8/2022 | Morita et al. |

(Continued)

FOREIGN PATENT DOCUMENTS

| | | |
|---|---|---|
| CN | 106687863 | 5/2017 |
| CN | 108909091 | 11/2018 |

(Continued)

OTHER PUBLICATIONS

Machine translation of JP-2005319661-A obtained from IP.com (Year: 2005).*

Extended European Search Report issued Jan. 19, 2024 in European patent application No. 21738337.1.

Extended European Search Report issued Jan. 26, 2024 in European patent application No. 21738041.9.

Extended European Search Report issued Jan. 26, 2024 in European patent application No. 21738566.5.

(Continued)

*Primary Examiner* — Kregg T Brooks
*Assistant Examiner* — David R. Foss
(74) *Attorney, Agent, or Firm* — Wenderoth, Lind & Ponack, L.L.P.

(57) ABSTRACT

An object of the present disclosure is to provide a coating composition containing a dissolved, specific fluoropolymer at a high concentration that is usable in fluoropolymer coating. The present disclosure relates to a coating composition containing a fluoropolymer and an aprotic solvent, and the fluoropolymer contains, as a main component, a monomer unit represented by formula (1):

(1)

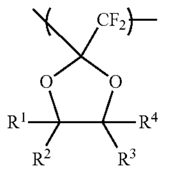

wherein $R^1$ to $R^4$ are each independently a fluorine atom, a fluoroalkyl group, or a fluoroalkoxy group; and the concentration of the fluoropolymer is 20 mass % or more based on the total mass of the coating composition.

10 Claims, No Drawings

(56) References Cited

FOREIGN PATENT DOCUMENTS

| | | | |
|---|---|---|---|
| EP | 1 724 291 | | 11/2006 |
| EP | 2 821 846 | | 1/2015 |
| EP | 4 053 173 | | 9/2022 |
| EP | 4 056 369 | | 9/2022 |
| JP | 43-29154 | | 12/1968 |
| JP | 58-69877 | | 4/1983 |
| JP | 5-339255 | | 12/1993 |
| JP | 2002-38075 | | 2/2002 |
| JP | 2004-59763 | | 2/2004 |
| JP | 2005319661 A | * | 11/2005 |
| JP | 2006-180450 | | 7/2006 |
| JP | 2006-290779 | | 10/2006 |
| JP | 2007-71839 | | 3/2007 |
| JP | 2007-517083 | | 6/2007 |
| JP | 2007-312551 | | 11/2007 |
| JP | 2008-40262 | | 2/2008 |
| JP | 2009-126879 | | 6/2009 |
| JP | 2010-131569 | | 6/2010 |
| JP | 2021-24901 | | 2/2012 |
| JP | 2012-46674 | | 3/2012 |
| JP | 2012-158726 | | 8/2012 |
| JP | 2012-214752 | | 11/2012 |
| JP | 2012-214753 | | 11/2012 |
| JP | 2014-067609 | | 4/2014 |
| JP | 2015-133505 | | 7/2015 |
| JP | 2020-122068 | | 8/2020 |
| JP | 2020-128520 | | 8/2020 |
| TW | 406091 | | 9/2000 |
| WO | 89/12071 | | 12/1989 |
| WO | 2000/004109 | | 1/2000 |
| WO | 2002/004534 | | 1/2002 |
| WO | 2005/042511 | | 5/2005 |
| WO | 2005/054313 | | 6/2005 |
| WO | 2005/095471 | | 10/2005 |
| WO | 2007/077722 | | 7/2007 |
| WO | 2008/069301 | | 6/2008 |
| WO | 2008/133088 | | 11/2008 |
| WO | 2008/136346 | | 11/2008 |
| WO | 2009/104699 | | 8/2009 |
| WO | 2010/055758 | | 5/2010 |
| WO | 2012/161162 | | 11/2012 |
| WO | 2014/065001 | | 5/2014 |
| WO | 2016/010043 | | 1/2016 |
| WO | 2018/066527 | | 4/2018 |
| WO | 2019/131290 | | 7/2019 |

OTHER PUBLICATIONS

Extended European Search Report issued Dec. 15, 2023 in European Application No. 21738168.0.

Fang et al. "Mechanical and optical properties of the copolymers of perfluoro(2-methylene-4-methyl-1,3-dioxolane) and chlorotrifluoroethylene", Journal of Fluorine Chemistry, 2018, vol. 214, pp. 63-67.

Extended European Search Report issued Dec. 22, 2023 in European Application No. 21737961.9.

Extended European Search Report issued Dec. 22, 2023 in European Application No. 21738833.9.

Koike, Kotaro, et al., "Synthesis and characterization of copolymers of perfluoro(2-methylene-4,5-dimethyl-1,3-dioxolane) and perfluoro(2-methylene-1,3-dioxolane)," Journal of Fluorine Chemistry, vol. 156, Oct. 18, 2013, pp. 198-202.

Yang, Yu, et al., "Novel Amorphous Perfluorocopolymeric System: Copolymers of Perfluoro-2-methylene-1,3-dioxolane Derivatives," Journal of Polymer Science: Part A: Polymer Chemistry, vol. 44, Jan. 26, 2006, pp. 1613-1618.

Okamoto, Y., et al., "The effect of fluorine substituents on the polymerization mechanism of 2-methylene-1,3-dioxolane and properties of the polymer products," Journal of Fluorine Chemistry, vol. 128, Dec. 15, 2006, pp. 202-206.

Chiang, Hao-Chun, et al., "Mechanical, optical and gas transport properties of poly(perfluoro-2-methylene-4-methyl-1,3-dioxolane) membrane containing perfluoropolyether as a plasticizer," Journal of Fluorine Chemistry, vol. 236, May 22, 2020 (4 pages).

Mikeš, F. et al., "Synthesis and Characterization of an Amorphous Perfluoropolymer: Poly(perfluoro-2-methylene-4-methyl-1,3-dioxolane)", Macromolecules, 2005, 38, pp. 4237-4245.

International Search Report issued Mar. 30, 2021 in International (PCT) Application No. PCT/JP2021/000252.

International Preliminary Report on Patentability and Written Opinion of the Searching Authority issued Jul. 12, 2022 in International (PCT) Application No. PCT/JP2021/000252.

International Search Report issued Apr. 6, 2021 in International (PCT) Application No. PCT/JP2021/000253.

International Preliminary Report on Patentability and Written Opinion of the Searching Authority issued Jul. 12, 2022 in International (PCT) Application No. PCT/JP2021/000253.

International Search Report issued Mar. 9, 2021 in International (PCT) Application No. PCT/JP2021/000254.

International Preliminary Report on Patentability and Written Opinion of the Searching Authority issued Jul. 12, 2022 in International (PCT) Application No. PCT/JP2021/000254.

International Search Report issued Feb. 22, 2021 in International (PCT) Application No. PCT/JP2021/000255.

International Preliminary Report on Patentability and Written Opinion of the Searching Authority issued Jul. 12, 2022 in International (PCT) Application No. PCT/JP2021/000255.

International Search Report issued Apr. 6, 2021 in International (PCT) Application No. PCT/JP2021/000256.

International Preliminary Report on Patentability and Written Opinion of the Searching Authority issued Jul. 12, 2022 in International (PCT) Application No. PCT/JP2021/000256.

International Search Report issued Mar. 23, 2021 in International (PCT) Application No. PCT/JP2021/000259.

International Preliminary Report on Patentability and Written Opinion of the Searching Authority issued Jul. 12, 2022 in International (PCT) Application No. PCT/JP2021/000259.

Yoshitaka Saito & Akira Tsukamoto "Recent Applications of Fluororesins", Polymers, vol. 41, 1992, pp. 770-773, with partial English translation.

* cited by examiner

COATING COMPOSITION CONTAINING FLUORINE POLYMER

TECHNICAL FIELD

The present disclosure relates to a coating composition containing a fluoropolymer, and the like.

BACKGROUND ART

For the purpose of imparting water repellency, antifouling functionality, and antireflection functionality, studies have been conducted on coating an object with a fluoropolymer. Attempts have been made to use fluoropolymers, for example, in antireflectants for displays, solar cells, and optical lenses, protective coatings for liquid repellency (water or oil repellency), and stain or moisture resistance for flexible boards of printers, solar cells, displays, photosensitive and fuser drums, optical thin films such as pellicle films, protective coatings for semiconductors, and interlayer insulating films for semiconductors (PTL 1).

CITATION LIST

Patent Literature

PTL 1: JP2002-038075A

SUMMARY

The present disclosure includes, for example, the following subject matter.

A coating composition comprising a fluoropolymer and an aprotic solvent, wherein the fluoropolymer comprises, as a main component, a monomer unit represented by formula (1):

(1)

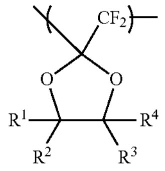

wherein $R^1$ to $R^4$ are each independently a fluorine atom, a fluoroalkyl group, or a fluoroalkoxy group; and wherein the concentration of the fluoropolymer is 20 mass % or more based on the total mass of the coating composition.

Advantageous Effects

The present disclosure provides a coating composition in which a fluoropolymer containing a monomer unit represented by formula (1) as a main component is dissolved in a high concentration. The present disclosure enables the formation of a film with high transparency and a high level of hardness by applying the coating composition to an object.

DESCRIPTION OF EMBODIMENTS

The above overview of the present disclosure is not intended to describe each of the disclosed embodiments or all of the implementations of the present disclosure.

The following description of the present disclosure illustrates embodiments of examples in more detail.

In several parts of the present disclosure, guidance is provided through examples, and these examples can be used in various combinations.

In each case, the group of examples can function as a non-exclusive and representative group.

All publications, patents, and patent applications cited herein are incorporated herein by reference in their entirety.

Terms

Unless otherwise specified, the symbols and abbreviations in the present specification can be understood in the sense commonly used in the technical field to which the present disclosure pertains, according to the context of the present specification.

In the present specification, the terms “comprise” and “contain” are used with the intention of including the terms “consisting essentially of” and “consisting of.”

Unless otherwise specified, the steps, treatments, or operations described in the present specification can be performed at room temperature. In the present specification, room temperature can mean a temperature within the range of 10° C. or higher and 40° C. or lower.

In the present specification, the phrase “$C_n$-$C_m$” (n and m are each a number) indicates that the number of carbon atoms is n or more and m or less, as would be commonly understood by a person skilled in the art.

In the present specification, the expression “thickness” or simply “film thickness” with respect to a film means an average film thickness. The “average film thickness” is determined as follows.

Average Film Thickness

The average film thickness is the average value of a thickness measured 5 times with a micrometer. When measuring the thickness of a film itself is difficult, such as when a film famed on a base material of a substrate etc. cannot be peeled off, the average film thickness is calculated by measuring the thickness of the base material before film formation and the thickness of the base material after film formation 5 times each with a micrometer, and subtracting the average value of the thickness before film formation from the average value of the thickness after film formation.

When the measurement cannot be performed with a micrometer, the film thickness obtained by measuring the line profile of the cut surface of a film to be measured with an atomic force microscope (AFM) is defined as the average film thickness.

Specifically, the average film thickness is a value determined by the method described in a specific example of the present disclosure.

In the present specification, a simply stated “molecular weight” refers to a “mass average molecular weight.” The mass average molecular weight is determined as described below.

Mass Average Molecular Weight

The mass average molecular weight is measured by the following GPC analysis method. Specifically, the mass average molecular weight is a value determined by the method described in a specific example of the present disclosure.

GPC Analysis Method

Sample Preparation Method

A polymer is dissolved in perfluorobenzene to prepare a 2 mass % polymer solution, and filtered through a membrane filter (0.22 μm) to prepare a sample solution.

Measurement Method

Standard sample for molecular weight: polymethyl methacrylate

Detection method: RI (differential refractometer)

In the present specification, the “water contact angle” and “n-hexadecane contact angle” are determined as described below.

Water Contact Angle and N-hexadecane Contact Angle

From a microsyringe, 2 μL of water or n-hexadecane is dropped onto a sample film placed horizontally, and the contact angle of the droplet on the film is measured with a fully automated contact angle meter (DropMaster 701 produced by Kyowa Interface Science Co., Ltd.). Specifically, the water contact angle and n-hexadecane contact angle are values determined by the method described in a specific example of the present disclosure.

In the present specification, the “indentation hardness” and “indentation elastic modulus” are determined as follows.

Indentation Hardness and Indentation Elastic Modulus

The indentation hardness of a sample ($H_{IT}$: indentation hardness) is measured with an ENT-2100 ultra-fine indentation hardness tester (produced by Nanotec Corporation). At the same time, the indentation elastic modulus is also measured. The indentation depth is adjusted to 1/10 or less of the thickness to perform the test. Specifically, the indentation hardness and indentation elastic modulus are values determined by the method described in a specific example of the present disclosure.

In the present specification, the “total light transmittance” and “haze” are determined as described below.

Method for Measuring Total Light Transmittance and Haze

The total light transmittance and haze are measured with an NDH 70005PII haze meter (produced by Nippon Denshoku Industries Co., Ltd.) in accordance with JIS K7136 (haze value) and JIS K 7361-1 (total light transmittance). A film with an average film thickness of 100 μm is used as a sample for measurement. Specifically, the total light transmittance and haze are values determined by the method described in a specific example of the present disclosure.

In the present specification, the “transmittance” at each wavelength is determined as described below.

Transmittance at Each Wavelength

The transmittance of a sample at a predetermined wavelength is measured with a U-4100 spectrophotometer (Hitachi). The sample is a film with an average film thickness of 100 μm. The detector for use is an integrating sphere detector. Specifically, the transmittance is a value determined by the method described in a specific example of the present disclosure.

In the present specification, the “refractive index” is determined as described below.

Refractive Index

The refractive index of a sample at 23° C. is measured with an Abbe refractive index meter (NAR-1T SOLID, produced by Atago Co., Ltd.). The wavelength is a wavelength approximate to D-line because of the use of the LED attached to the device. Specifically, the refractive index is a value determined by the method described in a specific example of the present disclosure.

In the present specification, the Abbe rate at each wavelength is determined as described below.

Abbe Number

The Abbe number of a sample at 23° C. is measured with an Abbe refractive index meter (NAR-1T SOLID, produced by Atago Co., Ltd.). Specifically, the Abbe number is a value determined by the method described in specific examples of the present disclosure.

In the present specification, the “reflectance” is determined as described below.

Reflectance

An absolute specular reflector is attached to a U-4100 spectrophotometer (Hitachi), and the reflectance at 550 nm at 5° is measured. Specifically, the reflectance is a value determined by the method described in a specific example of the present disclosure.

In the present specification, the “water absorption” is determined as described below.

Water Absorption (24° C.)

The weight of a sample that has been thoroughly dried beforehand is measured and set as W0. The sample is then completely immersed in water at 24° C. that is 100 times or greater than W0 by mass. The weight of the sample after 24 hours is measured and set as W24. The water absorption is determined from the following formula.

$$\text{Water absorption }(\%)=100\times(W24-W0)/W0$$

Specifically, the water absorption is a value determined by the method described in a specific example of the present disclosure.

Water Absorption (60° C.)

The weight of a sample that has been thoroughly dried beforehand is measured and set as W0, and then completely immersed in water at 60° C. that is 100 times or greater than W0 by mass. The weight of the sample after 24 hours is measured and set as W24. The water absorption is determined from the following formula.

$$\text{Water absorption }(\%)=100\times(W24-W0)/W0$$

Specifically, the water absorption is a value determined by the method described in a specific example of the present disclosure.

In the present specification, the “glass transition temperature” is determined as described below.

Glass Transition Temperature (Tg)

The temperature is increased (first run), decreased, and increased (second run) within the range of 30° C. or higher and 200° C. or lower at a rate of 10° C./min with a DSC (differential scanning calorimeter: DSC7000, Hitachi High-Tech Science Corporation), and the midpoint of the endothermic curve in the second run is determined to be the glass transition temperature (° C.). Specifically, the glass transition temperature is a value determined by the method described in a specific example of the present disclosure.

In the present specification, unless otherwise specified, examples of “alkyl” include linear or branched $C_1$-$C_{10}$ alkyl, such as methyl, ethyl, propyl, isopropyl, butyl, isobutyl, sec-butyl, tert-butyl, pentyl, isopentyl, neopentyl, hexyl, heptyl, octyl, nonyl, and decyl.

In the present specification, unless otherwise specified, “fluoroalkyl” is alkyl in which at least one hydrogen atom is replaced with a fluorine atom. “Fluoroalkyl” can be linear or branched fluoroalkyl.

The number of carbon atoms in “fluoroalkyl” can be, for example, 1 to 12, 1 to 6, 1 to 5, 1 to 4, 1 to 3, 6, 5, 4, 3, 2, or 1.

The number of fluorine atoms in “fluoroalkyl” can be 1 or more (e.g., 1 to 3, 1 to 5, 1 to 9, 1 to 11, or 1 to the maximum substitutable number).

“Fluoroalkyl” includes perfluoroalkyl.

“Perfluoroalkyl” is alkyl in which all hydrogen atoms are replaced with fluorine atoms.

Examples of perfluoroalkyl include trifluoromethyl ($CF_3$—), pentafluoroethyl ($C_2F_5$—), heptafluoropropyl ($CF_3CF_2CF_2$—), and heptafluoroisopropyl ($(CF_3)_2CF$—).

Specific examples of "fluoroalkyl" include monofluoromethyl, difluoromethyl, trifluoromethyl ($CF_3$—), 2,2,2-trifluoroethyl ($CF_3CH_2$—), perfluoroethyl ($C_2F_5$—), tetrafluoropropyl (e.g., $HCF_2CF_2CH_2$—), hexafluoropropyl (e.g., $(CF_3)_2CH$—), perfluorobutyl (e.g., $CF_3CF_2CF_2CF_2$—), octafluoropentyl (e.g., $HCF_2CF_2CF_2CF_2CH_2$—) perfluoropentyl (e.g., $CF_3CF_2CF_2CF_2CF_2$—), perfluorohexyl (e.g., $CF_3CF_2CF_2CF_2CF_2CF_2$—), and the like.

In the present specification, unless otherwise specified, "alkoxy" can be a group represented by RO—, wherein R is alkyl (e.g., $C_1$-$C_{10}$ alkyl).

Examples of "alkoxy" include linear or branched $C_1$-$C_{10}$ alkoxy, such as methoxy, ethoxy, propoxy, isopropoxy, butoxy, isobutoxy, sec-butoxy, tert-butoxy, pentyloxy, isopentyloxy, neopentyloxy, hexyloxy, heptyloxy, octyloxy, nonyloxy, and decyloxy.

In the present specification, unless otherwise specified, "fluoroalkoxy" is alkoxy in which at least one hydrogen atom is replaced with a fluorine atom. "Fluoroalkoxy" can be linear or branched fluoroalkoxy.

The number of carbon atoms in "fluoroalkoxy" can be, for example, 1 to 12, 1 to 6, 1 to 5, 1 to 4, 1 to 3, 6, 5, 4, 3, 2, or 1.

The number of fluorine atoms in "fluoroalkoxy" can be 1 or more (e.g., 1 to 3, 1 to 5, 1 to 9, 1 to 11, or 1 to the maximum substitutable number).

"Fluoroalkoxy" includes perfluoroalkoxy.

"Perfluoroalkoxy" is alkoxy in which all hydrogen atoms are replaced with fluorine atoms.

Examples of "perfluoroalkoxy" include trifluoromethoxy ($CF_3O$—), pentafluoroethoxy ($C_2F_5O$—), heptafluoropropoxy ($CF_3CF_2CF_2O$—), and heptafluoroisopropoxy ($(CF_3)_2CFO$—).

Specific examples of "fluoroalkoxy" include monofluoromethoxy, difluoromethoxy, trifluoromethoxy, 2,2,2-trifluoroethoxy ($CF_3CH_2O$—), perfluoroethoxy ($C_2F_5O$—), tetrafluoropropyloxy (e.g. $HCF_2CF_2CH_2O$—), hexafluoropropyloxy (e.g., $(CF_3)_2CHO$—), perfluorobutyloxy (e.g., $CF_3CF_2CF_2CF_2O$—), octafluoropentyloxy (e.g., $HCF_2CF_2CF_2CF_2CH_2O$—), perfluoropentyloxy (e.g., $CF_3CF_2CF_2CF_2CF_2O$—), perfluorohexyloxy (e.g., $CF_3CF_2CF_2CF_2CF_2CF_2O$—), and the like.

Coating Composition

One embodiment of the present disclosure is a coating composition containing a fluoropolymer that contains a monomer unit represented by formula (1) as a main component and an aprotic solvent. Fluoropolymers composed of such a monomer unit represented by formula (1) have low solubility in solvents. However, the coating composition can contain a dissolved fluoropolymer in a high concentration, such as in an amount of, for example, 20 mass % or more based on the total mass of the composition. Thus, the coating composition has advantages in tams of high yields in the formation of films of the fluoropolymer, and simple formation of thick films. The coating composition is in a liquid form, but may contain solid components in a size, amount, etc. that do not interfere with coating (film formation); however, it is preferred that the coating composition contain no solid components.

Fluoropolymer

The fluoropolymer contained in the coating composition comprises, as a main component, a monomer unit represented by formula (1):

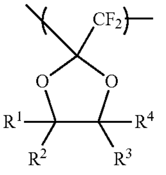

(1)

wherein $R^1$ to $R^4$ are each independently a fluorine atom, a fluoroalkyl group, or a fluoroalkoxy group (this monomer unit may be referred to as "unit (1)" in the present specification).

In the present specification, the phrases such as "comprising a monomer unit as a main component" mean that the percentage of the specific monomer unit is 50 mol % or more based on the total monomer units in a polymer.

Unit (1) as a monomer unit constituting the fluoropolymer may be used singly or in a combination of two or more.

The content of the fluoropolymer in the coating composition may be, for example, 5 mass % or more and 65 mass % or less, 10 mass % or more and 65 mass % or less, 20 mass % or more and 65 mass % or less, 30 mass % or more and 65 mass % or less, more than 30 mass % and 65 mass % or less, or 20 mass % or more and 40 mass % or less based on the total mass of the coating composition. The content of the fluoropolymer in the coating composition is preferably more than 20 mass % and 65 mass % or less, more preferably 25 mass % or more and 60 mass % or less, and particularly preferably 30 mass % or more and 50 mass % or less. The coating composition may contain a dissolved fluoropolymer in an amount within these ranges.

The glass transition temperature (Tg) of the fluoropolymer is preferably 110° C. or higher, more preferably 110° C. or higher and 300° C. or lower, still more preferably 120° C. or higher and 300° C. or lower, and particularly preferably 125° C. or higher and 200° C. or lower. A glass transition temperature within these ranges is advantageous in that a film formed from the coating composition has high bending durability.

The mass average molecular weight of the fluoropolymer is, for example, 10,000 or more and 1 million or less, preferably 30,000 or more and 500,000 or less, and more preferably 50,000 or more and 300,000 or less. A molecular weight within these ranges is advantageous in durability.

The fluoropolymer can be produced by, for example, polymerizing monomers corresponding to the monomer units that constitute the fluoropolymer by a suitable polymerization method. For example, the fluoropolymer can be produced by polymerizing a single type or two or more types of a monomer that correspond to unit (1).

Unit (1) (Monomer Unit having a 1,3-dioxolane Skeleton)

The monomer units that constitute the fluoropolymer may contain a single type or two or more types of unit (1). The percentage of unit (1) may be, for example, 70 mol % or more, preferably 80 mol % or more, more preferably 90 mol % or more, and particularly preferably 100 mol %, based on the total monomer units of the fluoropolymer.

In each of $R^1$ to $R^4$, fluoroalkyl can be, for example, linear or branched $C_1$-$C_5$ fluoroalkyl, linear or branched $C_1$-$C_4$ fluoroalkyl, linear or branched $C_1$-$C_3$ fluoroalkyl, or $C_1$-$C_2$ fluoroalkyl.

The linear or branched $C_1$-$C_5$ fluoroalkyl is preferably linear or branched $C_1$-$C_5$ perfluoroalkyl.

The linear or branched $C_1$-$C_4$ fluoroalkyl is preferably linear or branched $C_1$-$C_4$ perfluoroalkyl.

The linear or branched $C_1$-$C_3$ fluoroalkyl is preferably linear or branched $C_1$-$C_3$ perfluoroalkyl.

The $C_1$-$C_2$ fluoroalkyl is preferably $C_1$-$C_2$ perfluoroalkyl.

In each of $R^1$ to $R^4$, fluoroalkoxy can be, for example, linear or branched $C_1$-$C_5$ fluoroalkoxy, linear or branched $C_1$-$C_4$ fluoroalkoxy, linear or branched $C_1$-$C_3$ fluoroalkoxy, or $C_1$-$C_2$ fluoroalkoxy.

The linear or branched $C_1$-$C_5$ fluoroalkoxy is preferably linear or branched $C_1$-$C_5$ perfluoroalkoxy.

The linear or branched $C_1$-$C_4$ fluoroalkoxy is preferably linear or branched $C_1$-$C_4$ perfluoroalkoxy.

The linear or branched $C_1$-$C_3$ fluoroalkoxy is preferably linear or branched $C_1$-$C_3$ perfluoroalkoxy.

The $C_1$-$C_2$ fluoroalkoxy is preferably $C_1$-$C_2$ perfluoroalkoxy.

$R^1$ to $R^4$ can be each independently fluorine, linear or branched $C_1$-$C_5$ fluoroalkyl, or linear or branched $C_1$-$C_5$ fluoroalkoxy.

$R^1$ to $R^4$ can be each independently fluorine, linear or branched $C_1$-$C_5$ perfluoroalkyl, or linear or branched $C_1$-$C_5$ perfluoroalkoxy.

$R^1$ to $R^4$ can be each independently fluorine, linear or branched $C_1$-$C_4$ fluoroalkyl, or linear or branched $C_1$-$C_4$ fluoroalkoxy.

$R^1$ to $R^4$ can be each independently fluorine, linear or branched $C_1$-$C_4$ perfluoroalkyl, or linear or branched $C_1$-$C_4$ perfluoroalkoxy.

$R^1$ to $R^4$ can be each independently fluorine, linear or branched $C_1$-$C_3$ fluoroalkyl, or linear or branched $C_1$-$C_3$ fluoroalkoxy.

$R^1$ to $R^4$ can be each independently fluorine, linear or branched $C_1$-$C_3$ perfluoroalkyl, or linear or branched $C_1$-$C_3$ perfluoroalkoxy.

$R^1$ to $R^4$ can be each independently fluorine, $C_1$-$C_2$ fluoroalkyl, or $C_1$-$C_2$ fluoroalkoxy.

$R^1$ to $R^4$ can be each independently fluorine, $C_1$-$C_2$ perfluoroalkyl, or $C_1$-$C_2$ perfluoroalkoxy.

$R^1$ to $R^4$ can be each independently fluorine, trifluoromethyl, pentafluoroethyl, or trifluoromethoxy.

At least one of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least two of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least three of $R^1$ to $R^4$ can be fluorine, and the other group in $R^1$ to $R^4$ can be $C_1$-$C_2$ perfluoroalkyl or $C_1$-$C_2$ perfluoroalkoxy.

At least three of $R^1$ to $R^4$ can be fluorine atoms, and the other group in $R^1$ to $R^4$ can be $C_1$-$C_2$ perfluoroalkyl.

$R^1$ to $R^4$ can be all fluorine atoms.

Unit (1) can be a monomer unit represented by the following formula (1-1) (this unit may be referred to as "unit (1-1)" in the present specification).

(1-1)

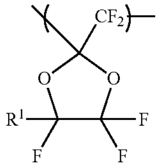

In the formula, $R^1$ is a fluorine atom, a fluoroalkyl group, or a fluoroalkoxy group.

Unit (1-1) as a monomer unit constituting the fluoropolymer may be used singly or in a combination of two or more.

In unit (1-1), $R^1$ can be fluorine, linear or branched $C_1$-$C_5$ fluoroalkyl, or linear or branched $C_1$-$C_5$ fluoroalkoxy.

In unit (1-1), $R^1$ can be fluorine, linear or branched $C_1$-$C_5$ perfluoroalkyl, or linear or branched $C_1$-$C_5$ perfluoroalkoxy.

In unit (1-1), $R^1$ can be fluorine, linear or branched $C_1$-$C_4$ fluoroalkyl, or linear or branched $C_1$-$C_4$ fluoroalkoxy.

In unit (1-1), $R^1$ can be fluorine, linear or branched $C_1$-$C_4$ perfluoroalkyl, or linear or branched $C_1$-$C_4$ perfluoroalkoxy.

In unit (1-1), $R^1$ can be fluorine, linear or branched $C_1$-$C_3$ fluoroalkyl, or linear or branched $C_1$-$C_3$ fluoroalkoxy.

In unit (1-1), $R^1$ can be fluorine, linear or branched $C_1$-$C_3$ perfluoroalkyl, or linear or branched $C_1$-$C_3$ perfluoroalkoxy.

In unit (1-1), $R^1$ can be fluorine, $C_1$-$C_2$ fluoroalkyl, or $C_1$-$C_2$ fluoroalkoxy.

In unit (1-1), $R^1$ can be fluorine, $C_1$-$C_2$ perfluoroalkyl, or $C_1$-$C_2$ perfluoroalkoxy.

In unit (1-1), $R^1$ can be fluorine, trifluoromethyl, pentafluoroethyl, or trifluoromethoxy.

In unit (1-1), $R^1$ can be $C_1$-$C_2$ perfluoroalkyl or $C_1$-$C_2$ perfluoroalkoxy.

In unit (1-1), $R^1$ can be $C_1$-$C_2$ perfluoroalkyl.

Preferred examples of unit (1-1) include a monomer unit represented by the following formula (1-11) (this monomer unit may be referred to as "unit (1-11)" in the present specification).

(1-11)

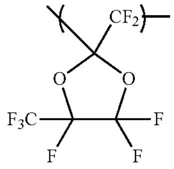

Fluoroolefin Unit

The fluoropolymer may comprise a fluoroolefin unit in addition to unit (1).

The fluoroolefin unit may be used singly or in a combination of two or more.

The percentage of the fluoroolefin unit can be 50 mol % or less, preferably 30 mol % or less, more preferably 20 mol % or less, even more preferably 10 mol % or less, and particularly preferably 0 mol %, based on the total monomer units.

The fluoroolefin unit is a monomer unit that is formed after polymerization of a monomer containing fluorine and a carbon-carbon double bond.

The atoms constituting the fluoroolefin unit may be only fluorine, halogen other than fluorine, carbon, hydrogen, and oxygen.

The atoms constituting the fluoroolefin unit may be only fluorine, halogen other than fluorine, carbon, and hydrogen.

The atoms constituting the fluoroolefin unit may be only fluorine, carbon, and hydrogen.

The atoms constituting the fluoroolefin unit may be only fluorine and carbon.

The fluoroolefin unit includes at least one unit selected from the group consisting of a fluorine-containing perhaloolefin unit, a vinylidene fluoride unit ($-CH_2-CF_2-$), a trifluoroethylene unit ($-CFH-CF_2-$), a pentafluoropropylene unit (—CFH—CF($CF_3$)—, —$CF_2$—CF($CHF_2$)—), a 1,1,1,2-tetrafluoro-2-propylene unit (—$CH_2$—CF($CF_3$)—), and the like.

The fluorine-containing perhaloolefin unit is a monomer unit that is formed after polymerization of a monomer containing fluorine and a carbon-carbon double bond, and optionally halogen other than fluorine.

The fluorine-containing perhaloolefin unit includes at least one member selected from the group consisting of a chlorotrifluoroethylene unit (—CFCl—$CF_2$—), a tetrafluoroethylene unit (—$CF_2$—$CF_2$—), a hexafluoropropylene unit (—$CF_2$—CF($CF_3$)—), a perfluoro(methyl vinyl ether) unit (—$CF_2$—CF($OCF_3$)—), a perfluoro(ethyl vinyl ether) unit (—$CF_2$—CF($OC_2F_5$)—), perfluoro(propyl vinyl ether) unit (—$CF_2$—CF($OCF_2C_2F_5$)—), perfluoro(butyl vinyl ether) unit (—$CF_2$—CF(O($CF_2$)$_2C_2F_5$)—), and a perfluoro (2,2-dimethyl-1,3-dioxol) unit (—CF—CAF— (wherein A represents a perfluorodioxolane ring formed with the adjacent carbon atom shown in the formula, with two trifluoromethyl bonded to the carbon atom at position 2 of the dioxolane ring).

The fluoroolefin unit includes at least one member selected from the group consisting of a chlorotrifluoroethylene unit, a tetrafluoroethylene unit, a hexafluoropropylene unit, a perfluoro(methyl vinyl ether) unit, and a perfluoro (propyl vinyl ether) unit.

Other Monomer Unit

The fluoropolymer may further contain one or more other monomer units in addition to unit (1) and the fluoroolefin unit. However, it is preferable to contain no other monomer units.

The other monomer units include $CH_2$=CHRf (wherein Rf represents a $C_1$-$C_{10}$ fluoroalkyl group) units, alkyl vinyl ether units (e.g., a cyclohexyl vinyl ether unit, ethyl vinyl ether unit, butyl vinyl ether unit, and methyl vinyl ether unit), alkenyl vinyl ether units (e.g., a polyoxyethylene allyl ether unit and ethyl allyl ether unit), organosilicon compound units having a reactive $\alpha,\beta$-unsaturated group (e.g., a vinyltrimethoxysilane unit, vinyltriethoxysilane unit, and a vinyltris(methoxyethoxy)silane unit), acrylic ester units (e.g., a methyl acrylate unit and ethyl acrylate unit), methacrylic ester units (e.g., a methyl methacrylate unit and ethyl methacrylate unit), vinyl ester units (e.g., a vinyl acetate unit, vinyl benzoate unit, and a VeoVA (vinyl ester produced by Shell plc) unit), and the like.

The percentage of the other monomer units may be, for example, 0 mol % or more and 20 mol % or less, or 0 mol % or more and 10 mol % or less, based on the total monomer units.

Aprotic Solvent

The aprotic solvent for use in the polymerization of fluoropolymers can be, for example, at least one member selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

The content of the aprotic solvent in the coating composition may be, for example, 35 mass % or more and 95 mass % or less, 35 mass % or more and 90 mass % or less, 35 mass % or more and 80 mass % or less, 35 mass % or more and 70 mass % or less, 35 mass % or more and less than 70 mass %, or 60 mass % or more and 80 mass % or less based on the total mass of the coating composition. The content of the aprotic solvent is preferably 35 mass % or more and less than 80 mass %, more preferably 40 mass % or more and 75 mass % or less, and particularly preferably 50 mass % or more and 70 mass % or less.

The perfluoroaromatic compound is, for example, a perfluoroaromatic compound optionally having one or more perfluoroalkyl groups. The aromatic ring of the perfluoroaromatic compound can be at least one ring selected from the group consisting of a benzene ring, a naphthalene ring, and an anthracene ring. The perfluoroaromatic compound can have one or more (e.g., one, two, or three) aromatic rings.

The perfluoroalkyl group as a substituent is, for example, linear or branched, $C_1$-$C_6$, $C_1$-$C_5$, or $C_1$-$C_4$ perfluoroalkyl, and preferably linear or branched $C_1$-$C_3$ perfluoroalkyl.

The number of substituents is, for example, one to four, preferably one to three, and more preferably one or two. When a plurality of substituents are present, the substituents may be the same or different.

Examples of perfluoroaromatic compounds include perfluorobenzene, perfluorotoluene, perfluoroxylene, and perfluoronaphthalene.

Preferred examples of perfluoroaromatic compounds include perfluorobenzene and perfluorotoluene.

The perfluorotrialkylamine is, for example, an amine substituted with three linear or branched perfluoroalkyl groups. The number of carbon atoms of each perfluoroalkyl group is, for example, 1 to 10, preferably 1 to 5, and more preferably 1 to 4. The perfluoroalkyl groups can be the same or different, and are preferably the same.

Examples of perfluorotrialkylamines include perfluorotrimethylamine, perfluorotriethylamine, perfluorotripropylamine, perfluorotriisopropylamine, perfluorotributylamine, perfluorotri-sec-butylamine, perfluorotri-tert-butylamine, perfluorotripentylamine, perfluorotriisopentylamine, and perfluorotrineopentylamine.

Preferred examples of perfluorotrialkylamines include perfluorotripropylamine and perfluorotributylamine.

The perfluoroalkane is, for example, a linear, branched, or cyclic $C_3$-$C_{12}$ (preferably $C_3$-$C_{10}$, more preferably $C_3$-$C_6$) perfluoroalkane.

Examples of perfluoroalkanes include perfluoropentane, perfluoro-2-methylpentane, perfluorohexane, perfluoro-2-methylhexane, perfluoroheptane, perfluorooctane, perfluorononane, perfluorodecane, perfluorocyclohexane, perfluoro (methylcyclohexane), perfluoro(dimethylcyclohexane) (e.g., perfluoro(1,3-dimethylcyclohexane)), and perfluorodecalin.

Preferred examples of perfluoroalkanes include perfluoropentane, perfluorohexane, perfluoroheptane, and perfluorooctane.

The hydrofluorocarbon is, for example, a $C_3$-$C_8$ hydrofluorocarbon. Examples of hydrofluorocarbons include $CF_3CH_2CF_2H$, $CF_3CH_2CF_2CH_3$, $CF_3CHFCHFC_2F_5$, 1,1,2,2,3,3,4-heptafluorocyclopentane, $CF_3CF_2CF_2CF_2CH_2CH_3$, $CF_3CF_2CF_2CF_2CF_2CHF_2$, and $CF_3CF_2CF_2CF_2CF_2CF_2CH_2CH_3$.

Preferred examples of hydrofluorocarbons include $CF_3CH_2CF_2H$ and $CF_3CH_2CF_2CH_3$.

The perfluorocyclic ether is, for example, a perfluorocyclic ether optionally having one or more perfluoroalkyl groups. The ring of the perfluorocyclic ether may be a 3- to 6-membered ring. The ring of the perfluorocyclic ether may have one or more oxygen atoms as a ring-constituting atom. The ring preferably has one or two oxygen atoms, and more preferably one oxygen atom.

The perfluoroalkyl group as a substituent is, for example, linear or branched $C_1$-$C_6$, $C_1$-$C_5$, or $C_1$-$C_4$ perfluoroalkyl. The perfluoroalkyl group is preferably linear or branched $C_1$-$C_3$ perfluoroalkyl.

The number of substituents is, for example, one to four, preferably one to three, and more preferably one or two. When a plurality of substituents are present, they may be the same or different.

Examples of perfluorocyclic ethers include perfluorotetrahydrofuran, perfluoro-5-methyltetrahydrofuran, perfluoro-5-ethyltetrahydrofuran, perfluoro-5-propyltetrahydrofuran, perfluoro-5-butyltetrahydrofuran, and perfluorotetrahydropyran.

Preferred examples of perfluorocyclic ethers include perfluoro-5-ethyltetrahydrofuran and perfluoro-5-butyltetrahydrofuran.

The hydrofluoroether is, for example, a fluorine-containing ether.

The hydrofluoroether preferably has a global warming potential (GWP) of 400 or less, and more preferably 300 or less.

Examples of hydrofluoroethers include $CF_3CF_2CF_2CF_2OCH_3$, $CF_3CF_2CF(CF_3)OCH_3$, $CF_3CF(CF_3)CF_2OCH_3$, $CF_3CF_2CF_2CF_2OC_2H_5$, $CF_3CH_2OCF_2CHF_2$, $C_2F_5CF(OCH_3)C_3F_7$, $(CF_3)_2CHOCH_3$, $(CF_3)_2CFOCH_3$, $CHF_2CF_2OCH_2CF_3$, $CHF_2CF_2CH_2OCF_2CHF_2$, $CF_3CHFCF_2OCH_3$, $CF_3CHFCF_2OCF_3$, trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethyl ether (HFE-245mf), 2,2-difluoroethyltrifluoromethyl ether (HFE-245pf), 1,1,2,3,3,3-hexafluoropropylmethyl ether ($CF_3CHFCF_2OCH_3$), 1,1,2,2-tetrafluoroethyl 2,2,2-trifluoroethyl ether ($CHF_2CF_2OCH_2CF_3$), and 1,1,1,3,3,3-hexafluoro-2-methoxypropane ($(CF_3)_2CHOCH_3$).

Preferred examples of hydrofluoroethers include $CF_3CF_2CF_2CF_2OCH_3$, $CF_3CF_2CF_2CF_2OC_2H_5$, $CF_3CH_2OCF_2CHF_2$, and $C_2F_5CF(OCH_3)C_3F_7$.

The hydrofluoroether is preferably a compound represented by the following formula (B1):

$$R^{21}—O—R^{22} \quad (B1),$$

wherein $R^{21}$ is linear or branched perfluorobutyl and $R^{22}$ is methyl or ethyl.

The olefin compound containing at least one chlorine atom is a $C_2$-$C_4$ (preferably $C_2$-$C_3$) olefin compound containing at least one chlorine atom in its structure. The olefin compound containing at least one chlorine atom is a compound in which at least one of the hydrogen atoms bonded to the carbon atoms in a $C_2$-$C_4$ hydrocarbon having one or two (preferably one) carbon-carbon double bonds (C═C) is replaced with chlorine. A compound in which at least one of the hydrogen atoms bonded to two carbon atoms constituting the carbon-carbon double bond in a $C_2$-$C_4$ hydrocarbon is replaced with chlorine is preferred.

The number of chlorine atoms is one to the maximum substitutable number. The number of chlorine atoms may be, for example, one, two, three, four, or five.

The olefin compound containing at least one chlorine atom may contain at least one (e.g., one, two, three, four, or five) fluorine atom.

Examples of olefin compounds containing at least one chlorine atom include $CH_2$═CHCl, CHCl═CHCl, $CCl_2$═CHCl, $CCl_2$═$CCl_2$, $CF_3CH$═CHCl, $CHF_2CF$═CHCl, $CFH_2CF$═CHCl, $CF_3CCl$═CFCl, $CF_2HCl$═CFCl, and $CFH_2Cl$═CFCl.

Preferred examples of olefin compounds containing at least one chlorine atom include CHCl═CHCl, $CHF_2CF$═CHCl, $CF_3CH$═CHCl, and $CF_3CCl$═CFCl.

As the aprotic solvent, a hydrofluoroether is preferable because it has less environmental impact during use and polymers can be dissolved at high concentrations in it.

Polymerization Initiator

The coating composition may contain at least one polymerization initiator. The content of the polymerization initiator in the coating composition is, for example, 0.00001 mass % or more and 10 mass % or less, preferably 0.00005 mass % or more and 10 mass % or less, and more preferably 0.0001 mass % or more and 10 mass % or less based on the total mass of the coating composition.

Preferred examples of polymerization initiators include di-n-propyl peroxydicarbonate, diisopropyl peroxydicarbonate, diisobutyryl peroxide, di(ω-hydro-dodecafluoroheptanoyl)peroxide, di(ω-hydro-hexadecafluorononanoyl)peroxide, ω-hydro-dodecafluoroheptanoyl-ω-hydro-hexadecafluorononanoyl-peroxide, benzoyl peroxide, tert-butyl peroxypivalate, tert-hexyl peroxypivalate, ammonium persulfate, sodium persulfate, and potassium persulfate.

Particularly preferred examples of polymerization initiators include di-n-propyl peroxydicarbonate, diisopropyl peroxydicarbonate, diisobutyryl peroxide, di(ω-hydro-dodecafluoroheptanoyl)peroxide, benzoyl peroxide, tert-butyl peroxypivalate, tert-hexyl peroxypivalate, and ammonium persulfate.

Other Components

The coating composition may contain a fluoropolymer, an aprotic solvent, optionally an polymerization initiator, and optionally other components in suitable amounts. Examples of other components include refractive index adjusters, antistatic agents, colorants, light diffusing agents, fillers, plasticizers, viscosity modifiers, flexibilizers, light-resistant stabilizers, reaction inhibitors, adhesion promoter, and the like. The content of other components may be, for example, 0.01 mass % or more and 50 mass % or less, preferably 0.01 mass % or more and 30 mass % or less, and more preferably 0.01 mass % or more and 20 mass % or less based on the total mass of the coating composition.

For example, the coating composition can be applied to a part in which a film is required by an appropriate method (e.g., spray coating, dip coating, bar coating, gravure coating, roll coating, inkjet, or spin coating), and then the solvent is removed by drying, heating, etc. to form a film. After the coating composition is applied, the applied coating composition is preferably heated. The drying or heating temperature is, for example, 30° C. or higher and 150° C. or lower, and preferably 30° C. or higher and 80° C. or lower. For example, a film can be formed by applying the coating composition of the present disclosure and then drying the composition in a dryer at 80° C.

Method for Producing Coating Composition

The coating composition may be produced by mixing a fluoropolymer, an aprotic solvent, optionally an polymerization initiator, and optionally other components. Alternatively, a single monomer, or two or more monomers corresponding to unit (1) may be polymerized (solution polymerization) optionally with at least one monomer selected from the group consisting of fluoroolefins and other monomers in an aprotic solvent to obtain a polymerization reaction liquid, and this polymerization reaction liquid may be used in the coating composition. Because of its high content of the dissolved fluoropolymer, the polymerization reaction liquid is advantageous as a coating composition itself or as a component of a coating composition. Thus, one embodiment of the present disclosure includes a method for producing a coating composition, comprising the step of polymerizing a monomer corresponding to unit (1), optionally with a fluoroolefin and other monomers, in an aprotic solvent optionally in the presence of a polymerization initiator.

The description of the coating composition above may be applied to the method for producing a coating composition.

The coating composition preferably contains the polymerization reaction liquid of the solution polymerization described above. The polymerization reaction liquid obtained by solution polymerization (a liquid containing at least a fluoropolymer and an aprotic solvent) may be optionally mixed with an aprotic solvent and/or other components to prepare a coating composition.

The content of the polymerization reaction liquid by solution polymerization in the coating composition can be suitably selected according to, for example, the concentration of the fluoropolymer in the polymerization reaction liquid, the functionality of the film formed from the coating composition, and/or the thickness of the film. The content of the polymerization reaction liquid by solution polymerization in the coating composition may be, for example, 5 mass % or more and 100 mass % or less, preferably 20 mass % or more and 100 mass % or less, and more preferably 30 mass % or more and 100 mass % or less based on the total mass of the coating composition.

Monomer

A person skilled in the art can understand the monomers corresponding to the monomer units that constitute a fluoropolymer. For example, a monomer corresponding to unit (1) is a compound represented by formula (M1):

(M1)

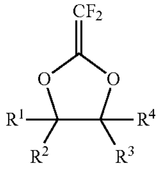

wherein $R^1$ to $R^4$ are as defined above (this monomer unit may be referred to as "monomer (M1)" in the present specification).

For example, a monomer corresponding to unit (1-1) is a compound represented by formula (M1-1):

(M1-1)

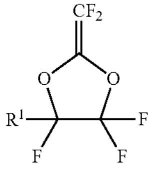

wherein $R^1$ is a fluorine atom, a fluoroalkyl group, or a fluoroalkoxy group (this monomer unit may be referred to as "monomer (M1-1)" in the present specification).

For example, a monomer corresponding to unit (1-11) is a compound represented by formula (M1-11):

(M1-11)

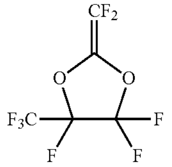

(this monomer unit may be referred to as "monomer (M1-11)" in the present specification).

The fluoroolefin for use can be the monomers corresponding to the fluoroolefin units described above. For example, the monomers corresponding to a tetrafluoroethylene unit, a hexafluoropropylene unit, and a vinylidene fluoride unit are respectively tetrafluoroethylene ($CF_2{=}CF_2$), hexafluoropropylene ($CF_3CF{=}CF_2$), and vinylidene fluoride ($CH_2{=}CF_2$). Thus, the details of the fluoroolefin can be understood by a person skilled in the art from the description of corresponding fluoroolefin units. The fluoroolefin may be, for example, at least one member selected from the group consisting of fluorine-containing perhaloolefin, vinylidene fluoride, trifluoroethylene, pentafluoropropylene, and 1,1,1,2-tetrafluoro-2-propylene. The fluoroolefin may preferably be at least one member selected from the group consisting of chlorotrifluoroethylene, tetrafluoroethylene, hexafluoropropylene, perfluoro(methyl vinyl ether), and perfluoro(propyl vinyl ether). The fluorine-containing perhaloolefin may be at least one member selected from the group consisting of chlorotrifluoroethylene, tetrafluoroethylene, hexafluoropropylene, perfluoro(methyl vinyl ether), perfluoro(ethyl vinyl ether), perfluoro(propyl vinyl ether), perfluoro(butyl vinyl ether), and perfluoro(2,2-dimethyl-1,3-dioxole).

The other monomer for use can be monomers corresponding to the other monomer units. Thus, the details of other monomers can be understood by a person skilled in the art from the description of corresponding other monomer units.

The polymerization method is, for example, dissolving or dispersing monomers corresponding to the monomer units that constitute a fluoropolymer optionally in a solvent (e.g., an aprotic solvent), optionally adding a polymerization initiator, and performing polymerization (e.g., a method of radical polymerization, bulk polymerization, solution polymerization, suspension polymerization, dispersion polymerization, emulsion polymerization, etc.). A preferable polymerization method is solution polymerization, which enables the production of a liquid in which a fluoropolymer is dissolved at a high concentration, gives a high yield, and is advantageous in thick film formation and purification. Thus, a fluoropolymer produced by solution polymerization is preferable as the fluoropolymer. A fluoropolymer produced by solution polymerization in which monomers are polymerized in the presence of an aprotic solvent is more preferable.

The solvent for use in the solution polymerization of a fluoropolymer is an aprotic solvent. The amount of the aprotic solvent for use in the production of a fluoropolymer is, for example, 80 mass % or less, less than 80 mass %, 75 mass % or less, 70 mass % or less, 35 mass % or more and 95 mass % or less, 35 mass % or more and 90 mass % or less, 35 mass % or more and 80 mass % or less, 35 mass % or more and 70 mass % or less, 35 mass % or more and less than 70 mass %, and 60 mass % or more and 80 mass % or less based on the sum of the mass of monomers and the mass of the solvent. The amount of the aprotic solvent for use is preferably 35 mass % or more and less than 80 mass %, more preferably 40 mass % or more and 70 mass % or less, and particularly preferably 50 mass % or more and 70 mass % or less.

If a polymerization initiator is used in polymerization reaction, the amount of the polymerization initiator can be, for example, 0.0001 g or more and 0.05 g or less, preferably 0.0001 g or more and 0.01 g or less, and more preferably 0.0005 g or more and 0.008 g or less, per gram of all of the monomers subjected to the reaction.

The temperature of the polymerization reaction can be, for example, −10° C. or higher and 160° C. or lower, preferably 0° C. or higher and 160° C. or lower, and more preferably 0° C. or higher and 100° C. or lower.

The reaction time for the polymerization reaction is preferably 0.5 hours or more and 72 hours or less, more preferably 1 hour or more and 48 hours or less, and even more preferably 3 hours or more and 30 hours or less.

The polymerization reaction can be performed in the presence or absence of an inert gas (e.g., nitrogen gas), and preferably in the presence of an inert gas.

The polymerization reaction can be performed under reduced pressure, atmospheric pressure, or increased pressure.

The polymerization reaction can be performed by adding one or more monomers to an aprotic solvent containing a polymerization initiator and subjecting it to polymerization conditions. The polymerization reaction can also be performed by adding a polymerization initiator to an aprotic solvent containing one or more monomers and subjecting it to polymerization conditions.

The fluoropolymer produced by the polymerization reaction may be purified, if desired, by a conventional method, such as extraction, dissolution, concentration, filtration, precipitation, reprecipitation, dehydration, adsorption, or chromatography, or a combination of these methods. Alternatively, a solution of the fluoropolymer produced by the polymerization reaction, a dilute solution thereof, or a mixture of the solution with other optional components or the like may be dried or heated (e.g., 30° C. or higher and 150° C. or lower) to form a film of the fluoropolymer.

Film Formed from Coating Composition

The content of the fluoropolymer in a film formed by, for example, drying the coating composition can be, for example, 50 mass % or more and 100 mass % or less, preferably 60 mass % or more and 100 mass % or less, more preferably 80 mass % or more and 100 mass % or less, and particularly preferably 90 mass % or more and 100 mass % or less, based on the total mass of the film.

The film may comprise other components in addition to the fluoropolymer. Such other components may be known components according to the use of the film, such as refractive index adjusters, colorants, light diffusing agents, fillers, plasticizers, viscosity modifiers, flexibilizers, light-resistant stabilizers, reaction inhibitors, and adhesion promoters.

The film may comprise other components in appropriate amounts as long as the effects of the present disclosure are obtained. The content of the other components can be, for example, 0 mass % or more and 50 mass % or less, preferably 0 mass % or more and 40 mass % or less, more preferably 0 mass % or more and 20 mass % or less, and particularly preferably 0 mass % or more and 10 mass % or less, based on the total mass of the film.

The film can be produced by removing the solvent, for example, by drying or heating the coating composition.

The thickness of the film can be appropriately selected, for example, according to the functions required in the film, and can be, for example, 10 nm or more, 10 nm or more and 1000 μm or less, 30 nm or more and 500 μm or less, or 50 nm or more and 500 μm or less. The thickness can be preferably 100 nm or more and 500 μm or less, more preferably 500 nm or more and 300 μm or less, even more preferably 800 nm or more and 200 μm or less, and particularly preferably 10 μm or more and 200 μm or less. An average film thickness within these ranges is advantageous in terms of durability. The coating composition according to the present disclosure is advantageous in forming a thick film (e.g., 100 nm or more, 500 nm or more) due to the high content of the fluoropolymer.

The film has a high level of indentation hardness due to the contained fluoropolymer, and thus has excellent scratch resistance. The indentation hardness of the film can be, for example, 250 $N/mm^2$ or more and 1000 $N/mm^2$ or less, preferably 300 $N/mm^2$ or more and 800 $N/mm^2$ or less, and more preferably 350 $N/mm^2$ or more and 600 $N/mm^2$ or less.

The indentation elastic modulus of the film can be, for example, 2.5 GPa or more and 10 GPa or less, preferably 2.5 GPa or more and 8 GPa or less, and more preferably 2.5 GPa or more and 6 GPa or less.

Because of the high permeability of the fluoropolymer, the film can be used as an optical material. The total light transmittance of the film can be, for example, 90% or more and 99% or less, preferably 92% or more and 99% or less, and more preferably 94% or more and 99% or less.

Because of the high UV light transmittance of the fluoropolymer, the film can also be used as an optical material for UV light. The transmittance of the film at 193 nm or more and 410 nm or less can be, for example, 60% or more, and preferably 70% or more.

The water contact angle of the film is, for example, 100° or more and 130° or less, preferably 100° or more and 120° or less, and more preferably 110° or more and 120° or less.

The n-hexadecane contact angle of the film is, for example, 30° or more and 75° or less, preferably 40° or more and 70° or less, and more preferably 50° or more and 70° or less.

The refractive index of the film can be, for example, 1.25 or more and 1.4 or less, preferably 1.29 or more and 1.37 or less, and more preferably 1.3 or more and 1.36 or less.

The Abbe number of the film can be, for example, 80 or more and 100 or less, preferably 85 or more and 96 or less, and more preferably 87 or more and 94 or less.

The reflectance (550 nm) of the film can be, for example, 0.5 or more and 0.7 or less, preferably 0.55 or more and 0.68 or less, and more preferably 0.6 or more and 0.65 or less.

The water absorption (24° C.) of the film can be, for example, 0.1% or less, preferably 0.05% or less, and more preferably 0.01%.

The film has a high level of hardness and thus has excellent scratch resistance, and is thus useful as a protective film, for example. Because the film has high light permeability, the film is useful, for example, as a protective film for optical components. Because the film can have a water contact angle of 100° or more and 130° or less, the film is resistant to dirt adhesion, and is thus useful, for example, as an antifouling film.

Because the coating composition contains a fluoropolymer, which is a raw material of films, at a high concentration, the coating composition is useful in forming a film of a fluoropolymer.

The coating composition can be used for forming anti-reflection films, such as for displays, solar cells, optical lenses, eyeglass lenses, show windows, and showcases; for forming liquid-repellant (water-repellant, oil-repellant), anti-fouling, or moisture-proof protective films, such as for displays, solar cells, optical lenses, eyeglass lenses, show windows, showcases, CDs, DVDs, Blu-ray discs, photosensitive and fuser drums, and flexible boards for printers; for forming protective films of semiconductor devices (e.g., interlayer films and buffer coating films); for forming moisture-proof films for devices (e.g., moisture-proof films for RF circuit devices, GaAs devices, and InP devices); for forming optical thin films such as pellicle films; for forming chemical-resistant films; for forming passivation films; for forming liquid-crystal light-distribution films; for forming anti-fouling films for medical instruments; for forming gate insulating films; and the like.

The present disclosure includes, for example, the following subject matter.

Item 1.

A coating composition comprising a fluoropolymer and an aprotic solvent, wherein the fluoropolymer comprises, as a main component, a monomer unit represented by formula (1):

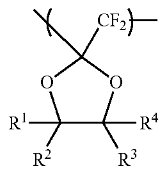

(1)

wherein $R^1$ to $R^4$ are each independently a fluorine atom, a fluoroalkyl group, or a fluoroalkoxy group; and wherein the concentration of the fluoropolymer is 20 mass % or more based on the total mass of the coating composition.

Item 2. The coating composition according to Item 1, wherein the fluoropolymer further comprises a fluoroolefin unit.

Item 3.

The coating composition according to Item 2, wherein the fluoroolefin unit is at least one member selected from the group consisting of a fluorine-containing perhaloolefin unit, a vinylidene fluoride unit, a trifluoroethylene unit, a pentafluoropropylene unit, and a 1,1,1,2-tetrafluoro-2-propylene unit.

Item 4.

The coating composition according to Item 3, wherein the fluorine-containing perhaloolefin unit is at least one member selected from the group consisting of a chlorotrifluoroethylene unit, a tetrafluoroethylene unit, a hexafluoropropylene unit, a perfluoro(methyl vinyl ether) unit, a perfluoro(ethyl vinyl ether) unit, a perfluoro(propyl vinyl ether) unit, a perfluoro(butyl vinyl ether) unit, and a perfluoro(2,2-dimethyl-1,3-dioxol) unit.

Item 5.

The coating composition according to Item 2, wherein the fluoroolefin unit is at least one member selected from the group consisting of a chlorotrifluoroethylene unit, a tetrafluoroethylene unit, a hexafluoropropylene unit, a perfluoro(methyl vinyl ether) unit, and a perfluoro(propyl vinyl ether) unit.

Item 6.

The coating composition according to any one of Items 1 to 5, wherein the fluoropolymer is a polymer formed from a monomer represented by formula (M1):

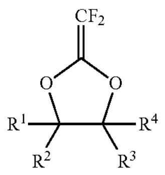

(M1)

wherein $R^1$ to $R^4$ are each independently a fluorine atom, a fluoroalkyl group, or a fluoroalkoxy group, in an aprotic solvent, or a polymer formed from the monomer represented by formula (M1) and a fluoroolefin in an aprotic solvent.

Item 7.

The coating composition according to Item 6, wherein the fluoroolefin is at least one member selected from the group consisting of fluorine-containing perhaloolefin, vinylidene fluoride, trifluoroethylene, pentafluoropropylene, and 1,1,1,2-tetrafluoro-2-propylene.

Item 8.

The coating composition according to Item 7, wherein the fluorine-containing perhaloolefin is at least one member selected from the group consisting of chlorotrifluoroethylene, tetrafluoroethylene, hexafluoropropylene, perfluoro(methyl vinyl ether), perfluoro(ethyl vinyl ether), perfluoro (propyl vinyl ether), perfluoro(butyl vinyl ether), and perfluoro(2,2-dimethyl-1,3-dioxol).

Item 9.

The coating composition according to Item 6, wherein the fluoroolefin is at least one member selected from the group consisting of chlorotrifluoroethylene, tetrafluoroethylene, hexafluoropropylene, perfluoro(methyl vinyl ether), and perfluoro(propyl vinyl ether).

Item 10.

The coating composition according to any one of Items 1 to 9, comprising a polymerization reaction liquid of the monomer represented by formula (M1) of Item 6 polymerized in an aprotic solvent and/or a polymerization reaction liquid of the monomer represented by formula (M1) of Item 6 and a fluoroolefin that are polymerized in an aprotic solvent.

Item 11.

The coating composition according to any one of Items 1 to 10, wherein the content of the fluoropolymer is 20 mass % or more and 65 mass % or less based on the total mass of the coating composition.

Item 12.

The coating composition according to any one of Items 1 to 11, wherein the aprotic solvent is at least one solvent selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

Item 13.

The coating composition according to any one of Items 1 to 12, wherein the aprotic solvent is at least one hydrofluoroether.

Item 14.

The coating composition according to any one of Items 1 to 13, which is for forming a film having an average film thickness of 10 nm or more.

Item 15.

The coating composition according to any one of Items 1 to 14, which is for forming a film having an indentation hardness of 250 $N/mm^2$ or more and 1000 $N/mm^2$ or less.

Item 16.

The coating composition according to any one of Items 1 to 15, which is for forming a film having an indentation elastic modulus of 2.5 GPa or more and 10 GPa or less.

Item 17.

The coating composition according to any one of Items 1 to 16, which is for forming a film having a total light transmittance of 90% or more.

Item 18.

The coating composition according to any one of Items 1 to 17, wherein the fluoropolymer has a glass transition temperature of 110° C. or higher.

Although embodiments are described above, it can be understood that various modifications in form and details may be made without departing from the spirit and scope of the claims.

EXAMPLES

An embodiment of the present disclosure is described in more detail below with Examples; however, the present disclosure is not limited to these.

The symbols and abbreviations in the Examples are used with the following meanings.

Initiator solution (1): a methanol solution containing 50 mass % di-n-propyl peroxydicarbonate (10-hour half-life temperature: 40° C.)

Fluoropolymer (1-11): a polymer composed of unit (1-11)

Mw: mass average molecular weight

GPC Analysis Method (Measurement of Mass Average Molecular Weight of Fluoropolymer)

Sample Preparation Method

A polymer was dissolved in perfluorobenzene to prepare a 2 mass % polymer solution, and the polymer solution was passed through a membrane filter (0.22 μm) to obtain a sample solution.

Measurement Method

Standard sample for measurement of molecular weight: polymethyl methacrylate

Detection method: RI (differential refractometer)

Confirmation of Polymer Solubility

Whether the polymer was dissolved in the liquid was determined as follows.

Each of the prepared liquids was visually observed, and when no undissolved polymer was observed and the entire liquid flowed uniformly at room temperature, it was determined that the polymer was dissolved.

Average Film Thickness

The average film thickness was defined as the average value of a thickness measured 5 times with a micrometer. When the thickness of a film formed on a base material such as a substrate was difficult to measure, for example, due to the difficulty of peeling off the film, the average film thickness was calculated by measuring the thickness of the base material before film formation and the thickness of the base material after film formation (the sum of the film thickness and the base material thickness) 5 times each with a micrometer, and subtracting the average value of the thickness before film formation from the average value of the thickness after film formation.

Indentation Hardness and Indentation Elastic Modulus

The indentation hardness ($H_{IT}$; indentation hardness) of the sample was measured using an ENT-2100 ultra-fine hardness tester produced by Nanotec Corporation. The indentation elastic modulus was also measured at the same time. The test was performed by adjusting the indentation depth to be 1/10 or less of the thickness.

Measurement Method for Total Light Transmittance and Haze

The total light transmittance and haze were measured using an NDH 7000SPII haze meter (produced by Nippon Denshoku Industries Co., Ltd.) in accordance with JIS K7136 (haze value) and JIS K7361-1 (total light transmittance). A film with an average film thickness of 100 μm was used as the sample to be measured. The sample was produced by coating a glass plate with a coating agent such that the thickness after drying was 100 μm, performing drying at 80° C. for 4 hours, and peeling off the resulting dried film with an average film thickness of 100 μm from the glass plate.

Transmittance at Each Wavelength

The transmittance at a specific wavelength of a sample (a film with an average film thickness of 100 μm) was measured using a Hitachi U-4100 spectrophotometer. An integrating sphere detector was used as the detector.

Refractive Index

The refractive index of a sample at 23° C. was measured with an Abbe refractive index meter (NAR-1T SOLID, produced by Atago Co., Ltd.). The wavelength was a wavelength approximate to D-line because of the use of the LED attached to the device.

Abbe Number

The Abbe number of a sample at 23° C. was measured with an Abbe refractive index meter (NAR-1T SOLID, produced by Atago Co., Ltd.).

Reflectance

An absolute specular reflector was attached to a Hitachi U-4100 spectrophotometer, and the reflectance at 550 nm at 5° was measured.

Water Absorption (24° C.)

The weight of a sample that had been thoroughly dried beforehand was measured and set as W0. The sample was then completely immersed in water at 24° C. that was 100 times or greater than W0 by mass. The weight of the sample after 24 hours was measured and set as W24. The water absorption was determined from the following formula.

$$\text{Water absorption (\%)}=100\times(W24-W0)/W0$$

Water Absorption (60° C.)

The weight of a sample that had been thoroughly dried beforehand was measured and set as W0, and then completely immersed in water at 60° C. that was 100 times or greater than W0 by mass. The weight of the sample after 24 hours was measured and set as W24. The water absorption was determined from the following formula.

$$\text{Water absorption (\%)}=100\times(W24-W0)/W0$$

Glass Transition Temperature (Tg)

The temperature was increased (first run), decreased, and increased (second run) within the range of 30° C. or higher and 200° C. or lower at a rate of 10° C./min with a DSC (differential scanning calorimeter: DSC7000, Hitachi High-Tech Science Corporation), and the midpoint of the endothermic curve in the second run was determined to be the glass transition temperature (° C.).

Example 1: Polymerization of Fluoropolymer Comprising Unit (1-11) as Main Component and Production of Polymer Solution (Polymerization Reaction Liquid)

The monomer (M1-11) (10 g), ethyl nonafluorobutyl ether (20 g) as a solvent, and the initiator solution (1) (0.041 g)

were placed in a 50-mL glass container, and a polymerization reaction was then performed for 20 hours while the mixture was heated such that the internal temperature was 40° C., thereby obtaining a polymerization reaction liquid containing a fluoropolymer (1-11) (9.0 g, Mw: 97533). The fluoropolymer in the polymerization reaction liquid was dissolved, and the concentration was 31 mass %.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 2: Polymerization of Fluoropolymer Comprising Unit (1-11) as Main Component and Production of Polymer Solution (Polymerization Reaction Liquid)

The monomer (M1-11) (10 g), perfluorotripropylamine (10 g) as a solvent, and the initiator solution (1) (0.052 g) were placed in a 20-mL glass container, and a polymerization reaction was then performed for 20 hours while the mixture was heated such that the internal temperature was 40° C., thereby obtaining a polymerization reaction liquid containing a fluoropolymer (1-11) (9.5 g, Mw: 213475). The fluoropolymer in the reaction liquid was dissolved, and the concentration was 49 mass %.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Reference Example 1

Ethyl nonafluorobutyl ether was further added to the polymerization reaction liquid obtained in Example 1 to obtain a solution of fluoropolymer at a concentration of 10 mass %.

Comparative Example 1: Production of Coating Composition by Dissolving Fluoropolymer (1-11)

Although ethyl nonafluorobutyl ether was added to fluoropolymer (1-11) to give a concentration of fluoropolymer (1-11) of 10 mass %, it took more than 2 days until fluoropolymer (1-11) was dissolved to form a homogeneous liquid coating composition. The low solubility of solid fluoropolymer (1-11) was confirmed.

Example 3

The polymerization reaction liquid obtained in Example 1 as is was used as a coating composition, and a film was produced as described below.

A glass substrate was coated with the coating composition to give a film thickness of 100 μm after drying, and dried at 80° C. for 4 hours, thereby forming a transparent film. Thereafter, the film was peeled off from the glass substrate, thereby obtaining a fluorine-containing polymer (1-11) with an average film thickness of 100 μm.

The indentation hardness and indentation elastic modulus of the obtained film were measured, and the results were as follows.

Indentation hardness: 420 $N/mm^2$
Indentation elastic modulus: 3.3 GPa

The obtained film was confirmed to have a high level of hardness, and is suitable for use in protective films.

Other properties of the obtained film were measured, and the results were as follows.

Specific gravity: 2.05
Total light transmittance: 96%
Haze: 0.34%
Transmittance (193 nm): 74.4%
Transmittance (550 nm) 94.6%
Refractive index: 1.335
Abbe number: 91
Reflectance (550 nm): 0.62%
Water absorption (24° C.): 0.00%
Water absorption (60° C.): 0.09%
Water contact angle: 116°
n-Hexadecane contact angle: 64°
Glass transformation temperature: 129° C.

The obtained film was confirmed to have sufficient transmittance over the entire wavelength range, and is suitable for use in optical protection. The obtained film was confirmed to have a very low refractive index and very low reflectance, and is suitable for use in antireflection. The obtained film was confirmed to have a low water absorption, and has reduced swelling and reduced changes in refractive index caused by water absorption, and is thus suitable for use in optical protection. The water contact angle and n-hexadecane contact angle of the obtained film indicate that the obtained film is suitable for use in antifouling purposes.

Example 4

The polymerization reaction liquid obtained in Example 2 as is was used as a coating composition, and a film was produced as described below.

A glass substrate was coated with the coating composition to give a film thickness of 50 μm after drying, and dried at 80° C. for 4 hours, thereby forming a transparent film. Thereafter, the film was peeled off from the glass substrate, thereby obtaining a fluorine-containing polymer (1-11) with an average film thickness of 50 μm.

The indentation hardness and indentation elastic modulus of the obtained film were measured, and the results were as follows. Other items were also measured as in Example 1, and the results were similar to those of Example 1.

Indentation hardness: 415 $N/mm^2$
Indentation elastic modulus: 3.5 GPa

Example 5

The polymerization reaction liquid obtained in Example 2 as is was used as a coating composition, and a film was produced as described below.

A glass substrate was coated with the coating composition to give a film thickness of 25 μm after drying, and dried at 80° C. for 4 hours, thereby forming a transparent film. Thereafter, the film was peeled off from the glass substrate, thereby obtaining a fluorine-containing polymer (1-11) with an average film thickness of 25 μm. The indentation hardness and indentation elastic modulus of the obtained film were measured, and the results were as follows. Other items were also measured as in Example 1, and the results were similar to those of Example 1.

Indentation hardness: 417 $N/mm^2$
Indentation elastic modulus: 3.5 GPa

Comparative Example 2: Teflon (Registered Trademark) Solution

Teflon (registered trademark) AF1600 (2.0 g, Mw: 229738), which is a commercially available fluoropolymer, was added to methyl nonafluorobutyl ether (8.0 g), and the mixture was stirred at room temperature for 2 days to prepare a uniformly dissolved solution.

Teflon (registered trademark) AF1600 contains the monomer unit represented by the following formula (10) and the monomer unit represented by the following formula (20) in a ratio of 65:35 (molar ratio).

(10)

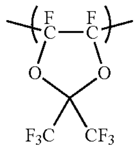

(20)

$-(CF_2-CF_2)-$

The obtained fluoropolymer solution was used as a coating composition to form a film. A glass substrate was coated with the coating composition and dried at 80° C. for 4 hours, thereby forming a transparent film with an average film thickness of 50 μm. The indentation hardness and indentation elastic modulus of the obtained film were respectively 145 $N/mm^2$ and 2 GPa, which were both lower than the values in Examples 3 to 5.

Comparative Example 3: Film Formed from Fluoropolymer

The indentation hardness and indentation elastic modulus of a Neoflon FEP NF-0100 film (produced by Daikin Industries, Ltd.) were measured, and the results were as follows. The film was formed of a fluoropolymer, but was insoluble in a solvent. Thus, when the film was added to methyl nonafluorobutyl ether and perfluorotripropylamine, the film was not dissolved, and a coating liquid could not be prepared.

Indentation hardness: 9.7 $N/mm^2$

Indentation elastic modulus: 0.02 GPa

The invention claimed is:

1. A coating composition comprising a fluoropolymer and an aprotic solvent, wherein the fluoropolymer comprises a monomer unit represented by formula (1) in an amount of 100 mol % based on the total monomer units of the fluoropolymer:

(1)

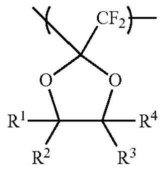

wherein $R^1$ to $R^4$ are each independently a fluorine atom, a fluoroalkyl group, or a fluoroalkoxy group;

wherein the fluoropolymer is dissolved in the composition; and wherein the concentration of the dissolved fluoropolymer is 31 mass % or more and 65 mass % or less based on the total mass of the coating composition.

2. The coating composition according to claim 1, wherein the fluoropolymer is a polymer formed from a monomer represented by formula (M1):

(M1)

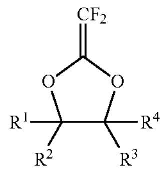

wherein $R^1$ to $R^4$ are each independently a fluorine atom, a fluoroalkyl group, or a fluoroalkoxy group, in an aprotic solvent.

3. The coating composition according to claim 1, comprising a polymerization reaction liquid of a monomer represented by formula (M1):

(M1)

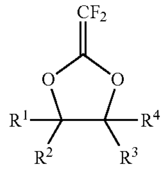

wherein $R^1$ to $R^4$ are each independently a fluorine atom, a fluoroalkyl group, or a fluoroalkoxy group, polymerized in an aprotic solvent.

4. The coating composition according to claim 1, wherein the aprotic solvent is at least one solvent selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

5. The coating composition according to claim 1, wherein the aprotic solvent is at least one hydrofluoroether.

6. The coating composition according to claim 1, which is for forming a film having an average film thickness of 10 nm or more.

7. The coating composition according to claim 1, which is for forming a film having an indentation hardness of 250 $N/mm^2$ or more and 1000 $N/mm^2$ or less.

8. The coating composition according to claim 1, which is for forming a film having an indentation elastic modulus of 2.5 GPa or more and 10 GPa or less.

9. The coating composition according to claim 1, which is for forming a film having a total light transmittance of 90% or more.

10. The coating composition according to claim 1, wherein the fluoropolymer has a glass transition temperature of 110° C. or higher.

* * * * *